No. 866,865. PATENTED SEPT. 24, 1907.
A. F. JONES & B. J. EVANS.
ATTACHMENT FOR CREAM SEPARATORS.
APPLICATION FILED SEPT. 23, 1905.

2 SHEETS—SHEET 1.

Witnesses:
R. C. Orwig.
A. H. Orwig.

Inventors: Albert F. Jones
B. J. Evans.
By Thomas G. Orwig, Attorney.

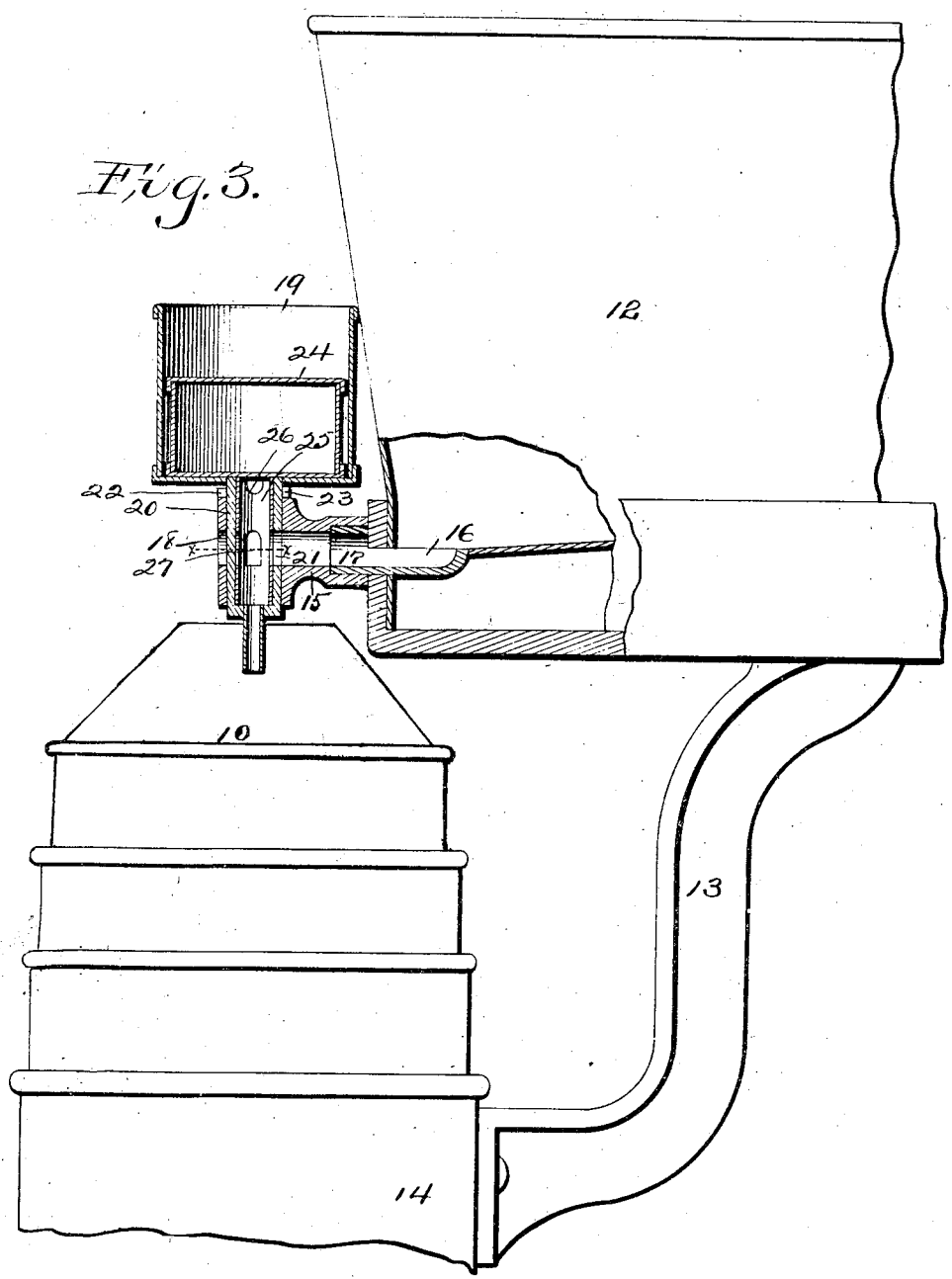

UNITED STATES PATENT OFFICE.

ALBERT F. JONES, OF WAUTOMA, AND BENJAMIN J. EVANS, OF NEW LONDON, WISCONSIN.

ATTACHMENT FOR CREAM-SEPARATORS.

No. 866,865. Specification of Letters Patent. Patented Sept. 24, 1907.

Application filed September 23, 1905. Serial No. 280,083.

*To all whom it may concern:*

Be it known that we, ALBERT F. JONES and BENJAMIN J. EVANS, citizens of the United States, residing, respectively, at Wautoma, county of Waushara, and New London, county of Waupaca, State of Wisconsin, have invented a new and useful Improvement in Attachments for Cream-Separators, of which the following is a specification.

Our object is to connect the lower part of a supply can of a cream separator on the level with the top of a bowl, as required, to lower the can, to facilitate pouring milk into it.

Our invention consists in the construction and combination of elements and sub-combinations, and the arrangement and combination of parts with a separator bowl, as hereinafter set forth, pointed out in our claims, and illustrated in the accompanying drawings, in which:—

Figure 1:
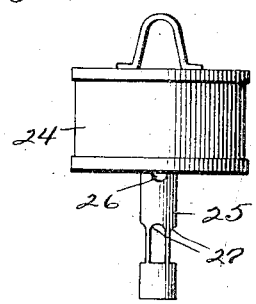
Figure 2:
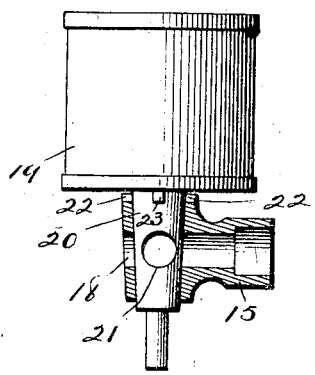
Figure 4:
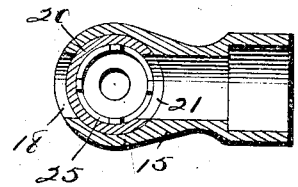

Figure 1 is a side view of the float valve having an open stem at its lower end. Fig. 2 is a corresponding view of the valve seat that has a tubular extension to receive the valve stem and is adapted to be detachably connected with the supply can and the bowl. Fig. 3 is a vertical sectional view, that shows the top portion of the machine provided with a support for the supply can, and the supply can provided with a support for the detachable valve seat and its tubular extension, and the float valve in position, as required, to open communication between the supply can and the bowl. Fig. 4 is a horizontal sectional view of Fig. 3, that shows the valve open, as required, to permit milk to flow from the supply can into the bowl.

The numeral 10 designates the top portion of the bowl of the machine into which milk is conveyed from the supply can 12 that rests upon the support 13 in the form of a tray or pan fixed to the upper portion of the machine frame 14, the flange or vertical part of the pan support will rest in the top end portion of the bowl 10, as shown in Fig. 3, as required, to allow a valve support to rest upon the top of the bowl and to lower a milk can relatively to the bowl.

A support for the float valve in the form of a tubular T-joint 15, is detachably connected with the bottom of a supply can 12 by means of a lip 16 fitted in the bottom of the can, and provided with an extension 17 at its outer end, as shown in Fig. 3, in such a manner that the support 15 can be readily connected with the extension 17.

The vertical part of the T-joint support 15 has an opening 18, that coincides with the opening of its horizontal part, that can be opened and closed by adjusting the float valve rotatably connected to the support, as shown in Fig. 3.

The valve seat is a cup 19, that has a fixed tubular extension 20, communicating with the bottom and center of the cup; and the extension has an aperture 21 that can be placed in coinciding position with the opening 18 in the vertical part of the support 15. In Fig. 3 the aperture 21 is in coinciding position with the open end of the horizontal part of the support 15, as required, to allow milk to flow from the supply can 12 into the bowl 10. By rotating the cup 19 and its tubular extension 20 a half revolution, the aperture 21 will be closed and the opening 18 opened, as required, to allow air into the tubular extension 20.

The top of the support has shoulders 22 at a central line at the top of its circumference, and the tubular extension 20 has a fixed stop 23 that engages the shoulders 22, as required, to restrict the revolution of the cup and its extension to a half revolution in each direction.

The valve is composed of a float 24 in the form of a cylindrical air-tight vessel fitted loosely in the cup 19 and provided with a tubular valve stem 25 fixed to the center of its bottom, to extend down into the tubular extension 20 from the bottom and center of the cup 19. The stem has apertures 26 at its top and openings 27 at its central portion. The openings 27 allow milk to flow from the can 12 through the opening 21 in the tubular extension 20 into the stem 25 and down into the bowl 10, and whenever there is too much accumulation of milk in the bowl the milk will rise in the stem and press upwards and lift the float 24 in the cup 19 and pass into the cup and retain it elevated. And as the float and valve stem are thus raised the lower portion of the stem will partly close the aperture 21 in the tubular stem 20, and thus automatically regulate the flow of milk from the can 12 into the bowl 10. By thus fixing the milk can support 13 to the machine so that its flange will engage the upper part of the bowl 10 and connecting the valve support 15 with the bottom of the milk can 12, as shown in Fig. 3, the said valve support can rest direct upon the top of the bowl 10, as required, to securely support the milk can on a level with the top of the bowl in such a manner that the support of the valve and the valve can be readily detached from the milk can for cleaning, and the milk can lifted away from its fixed support and the machine, whenever desired.

Having thus set forth the purposes of our invention and the construction and function of each element and sub-combination, and the arrangement and combination of all the operative parts, the practical operation and utility of our invention will be understood by dairymen and others familiar with cream separators.

What we claim as new and desire to secure by Letters-Patent, is:—

1. In a cream separator, a support formed with a flange to receive the supply can, a lip extending through the flange and supply can and forming a channel, a valve support adapted to be connected to said lip, and a valve working in said valve support.

2. In a cream separator, a support having an annular rim to receive the supply can, a lip extending into the rim and outwardly beyond the same, a detachable tubular valve support connected to the same, a revoluble cup formed with a tubular extension, said tubular extension reaching into the tubular support, and a float having a tubular extension reaching into the tubular extension of the cup.

3. A cream separator, consisting of a tubular lip extending into the supply can and adapted to receive a detachable tubular valve support, said support having horizontal and tubular channels, a cup having a tubular stem extending through the support, said stem formed with a lateral opening, and a float having openings near its center and upper portion, so that the supply can may be lowered.

4. In a cream separator, a can support having a flange adapted to contact with the upper portion of the receiving bowl, a lip extending into the flange, a tubular valve support adapted to be connected to the lip, a revoluble cup having a tubular extension depending into the bowl of the separator, and a float valve working in said cup.

5. In a cream separator, a support having a detachable lip extending into the same, a tubular valve-support detachably connected to the lip, a cup having a tubular extension working in the support, a regulating valve working in the cup, and a receiving bowl into which the tubular extension depends, so that the milk supply can be lowered relatively to the bowl.

ALBERT F. JONES.
BENJAMIN J. EVANS.

Witnesses:
TOSTEN THOMPSON,
REINERT THOMPSON.